(12) United States Patent
Zhang et al.

(10) Patent No.: US 7,936,916 B2
(45) Date of Patent: May 3, 2011

(54) SYSTEM AND METHOD FOR VIDEO QUALITY MEASUREMENT BASED ON PACKET METRIC AND IMAGE METRIC

(75) Inventors: Chunhong Zhang, Beijing (CN); Xin-yu Ma, Beijing (CN); Guosong Zhang, Beijing (CN)

(73) Assignee: JDS Uniphase Corporation, Milpitas, CA (US)

( * ) Notice: Subject to any disclaimer, the term of this patent is extended or adjusted under 35 U.S.C. 154(b) by 1112 days.

(21) Appl. No.: 11/707,513

(22) Filed: Feb. 16, 2007

(65) Prior Publication Data

US 2008/0037864 A1  Feb. 14, 2008

(30) Foreign Application Priority Data

Aug. 8, 2006  (CN) .......................... 2006 1 0109545

(51) Int. Cl.
  *G06K 9/00* (2006.01)
(52) U.S. Cl. ......... 382/156; 382/232; 382/275; 348/180
(58) Field of Classification Search .................. 348/180, 348/E17.001; 382/156, 250; 375/240.01, 375/E7.13, E7.14, E7.153, E7.165
  See application file for complete search history.

(56) References Cited

U.S. PATENT DOCUMENTS

| | | | |
|---|---|---|---|
| 5,046,019 A * | 9/1991 | Basehore | 706/1 |
| 6,075,884 A * | 6/2000 | Lubin et al. | 382/156 |
| 6,285,797 B1 * | 9/2001 | Lubin et al. | 382/254 |
| 6,876,381 B2 * | 4/2005 | Van Zon | 348/180 |
| 7,668,397 B2 * | 2/2010 | Le Dinh et al. | 382/275 |
| 7,764,844 B2 * | 7/2010 | Bouk et al. | 382/250 |
| 2001/0036293 A1 * | 11/2001 | Laumeyer et al. | 382/104 |
| 2003/0121053 A1 * | 6/2003 | Honda | 725/107 |
| 2003/0158587 A1 * | 8/2003 | Esteller et al. | 607/45 |
| 2004/0156559 A1 * | 8/2004 | Cheng et al. | 382/286 |
| 2007/0047640 A1 * | 3/2007 | Venna et al. | 375/240.01 |
| 2008/0037864 A1 * | 2/2008 | Zhang et al. | 382/156 |

* cited by examiner

*Primary Examiner* — Gregory M Desire
(74) *Attorney, Agent, or Firm* — Matthew A. Pequignot; Pequignot + Myers LLC

(57) ABSTRACT

A video quality measurement (VQM) system for a video stream includes a neural network VQM module having a constructed architecture to calculate a video quality metric based on a hybrid of image metric and packet metric of the video stream. An image metric measuring module receives the video stream and calculates the image metric of the video stream. A packet metric measuring module obtains information about packet-level characteristics of the video stream to calculate the packet metric. The image metric and the packet metric are inputted to the neural network VQM module to calculate the video quality metric. The VQM system further includes a VQM test-bed that determines and validates the architecture of the neural network VQM module. Furthermore, a video quality measurement (VQM) method based on a hybrid of image metric and packet metric is also described.

20 Claims, 10 Drawing Sheets

SYSTEM AND METHOD FOR VIDEO QUALITY MEASUREMENT BASED ON PACKET METRIC AND IMAGE METRIC

TECHNICAL FIELD

The technical field relates to video quality measurement. In particular, it relates to measuring no-reference real-time in-service video quality using packet metric and image metric.

BACKGROUND

As video services (e.g., video cellular phone, video conference, video on demand, Internet protocol television, and distance-learning) are employed in packet networks (e.g., next generation networks, triple-play networks, or 3rd generation networks), there is a need to measure in-service video quality transmitted over packet networks in real time.

There are two kinds of VQM methods: subjective method and objective method. Subjective VQM methods are based on evaluations made by human subjects under well-defined and controlled conditions. Subjective methods are very costly and time-consuming. In addition, the processes of subjective methods cannot be automated.

An objective VQM method employs a given mathematical, physical, or psycho-psychological model to evaluate video quality. The objective methods include a full-reference (FR) objective VQM method, a reduced-reference (RF) objective VQM method, and a no-reference (NR) objective VQM method. Both the FR and the RF methods need to make a reference to the original video (i.e. the video actually transmitted from the transmitting side) and cannot be used for real-time in-service video quality measurement. The NR methods, on the other hand, do not need to make a reference to the original video. Instead, the NR methods make observations only on decoded video (i.e. the video that has been received and decoded on the receiving side) and estimate the video quality using only the observed information on the decoded video. This makes the NR methods suitable for real-time in-service VQM in realistic network environment.

The NR methods are generally classified into two categories. The first one refers to a NR method using image metric and the second one refers to a NR method using packet metric.

The image metric-based NR method evaluates video quality by analyzing the image features of video images that the end users received, such as jerkiness, blockiness, blurriness, spatial information, and temporal information. One disadvantage of this method is its high computational complexity. This makes it not suitable for real-time applications, especially for mobile device with limited computational resource. The other drawback is that it cannot be applied to network troubleshooting.

The packet metric-based NR method evaluates video quality by measuring packet-level characteristics of video streams, such as jitter, delay, packet loss. One disadvantage of this method is its inability to correlate well with human perception. Although prior proposals have been made to overcome the problem, they are still incapable of capturing video impairments caused by the source, a very typical and common issue in video cellular phone and video conference applications.

Thus, what is needed is a NR method and system that measures video quality in real time without the above-mentioned drawbacks.

SUMMARY

A video quality measurement (VQM) system for a video stream includes a neural network VQM module having a constructed architecture to calculate a video quality metric based on a hybrid of image metric and packet metric of the video stream. An image metric measuring module receives the video stream and calculates the image metric of the video stream. A packet metric measuring module obtains information about packet-level characteristics of the video stream to calculate the packet metric. The image metric and the packet metric are applied to the neural network VQM module to calculate the video quality metric. The VQM system further includes a VQM test-bed to determine and validate the architecture of the neural network VQM module.

BRIEF DESCRIPTION OF THE DRAWINGS

The foregoing and other features of this invention may be more fully understood from the following description, when read together with the accompanying drawings.

DETAILED DESCRIPTION

Figure 1:
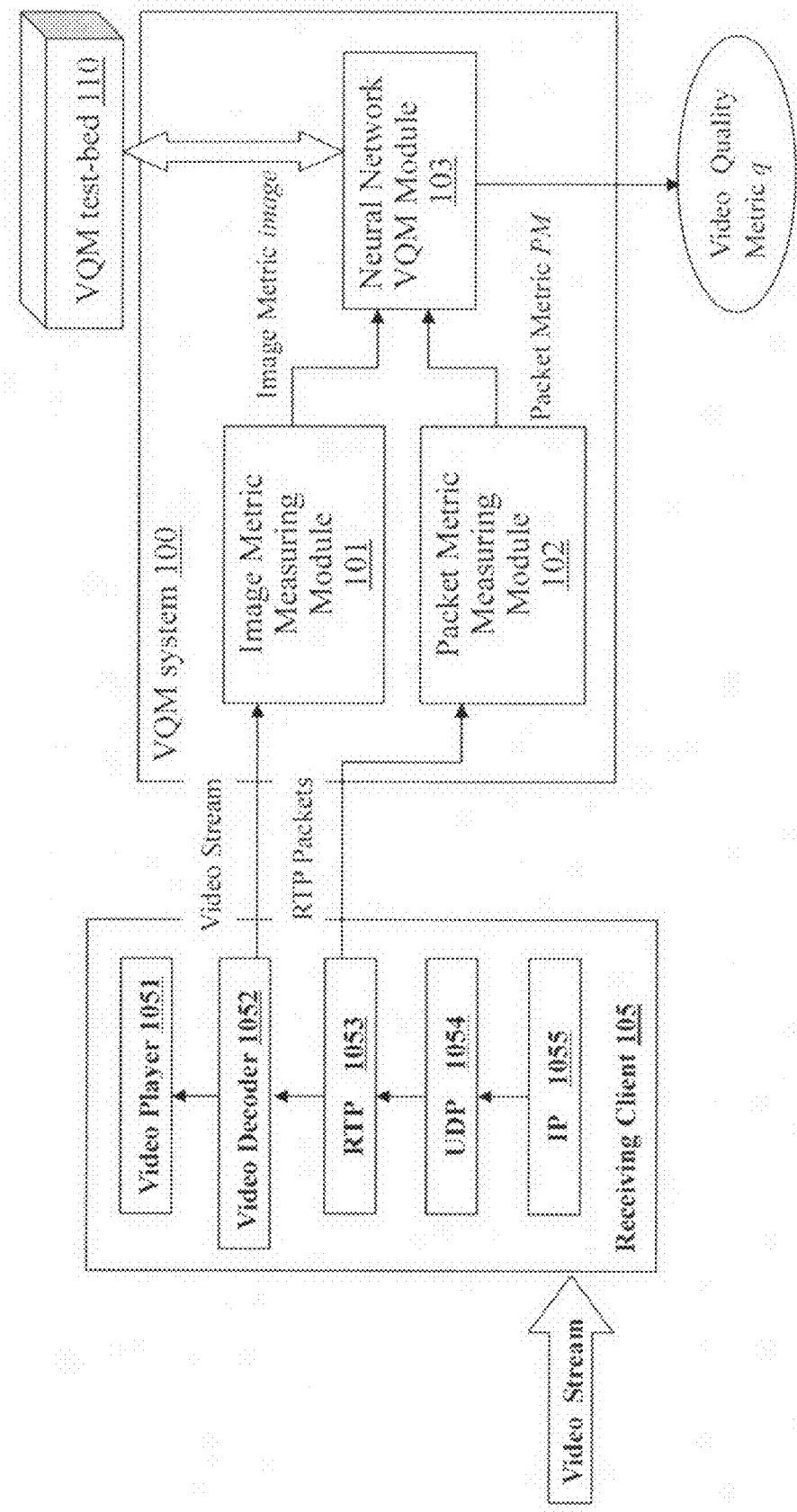
FIG. 1 illustrates a block diagram of a video quality measurement (VQM) system utilizing a hybrid of packet metric and image metric to calculate a video quality metric of a video stream in accordance with one embodiment of the present invention.

According to an embodiment of the present invention and as shown in FIG. 1, a video quality measurement (VQM) system 100 is provided to evaluate video quality of a video stream in real time based on a hybrid of packet metric and image metric of the measured video stream. The VQM system 100 utilizes a neural network VQM module 103 to produce a video quality metric of the measured video stream based on the packet metric and the image metric of the measured video stream. This allows the VQM system 100 to enable NR (no-reference) real-time in-service video quality measurement with improved correlation with human perception. Meanwhile, the VQM system 100 of FIG. 1 in accordance with one embodiment of the present invention has low computational complexity that allows the system 100 to be used in wireless VQM applications or portable instruments, whose computational resources are in most cases very limited, and in wireline VQM applications offering simultaneous multiple channels of video streaming. Moreover, the system 100 in accordance with one embodiment of the present invention can also be applied to network troubleshooting.

Detailed description of the VQM system 100 in accordance with one embodiment of the present invention is given below with respect to MPEG4 video format streaming as an example. However, it should be noted that the VQM system 100 in accordance with one embodiment of the present invention can be applied to other video formats, such as MPEG2, H.263, H.264/AVC, VC-1 etc.

Structure and Operational Theory of the VQM system

Figure 3:
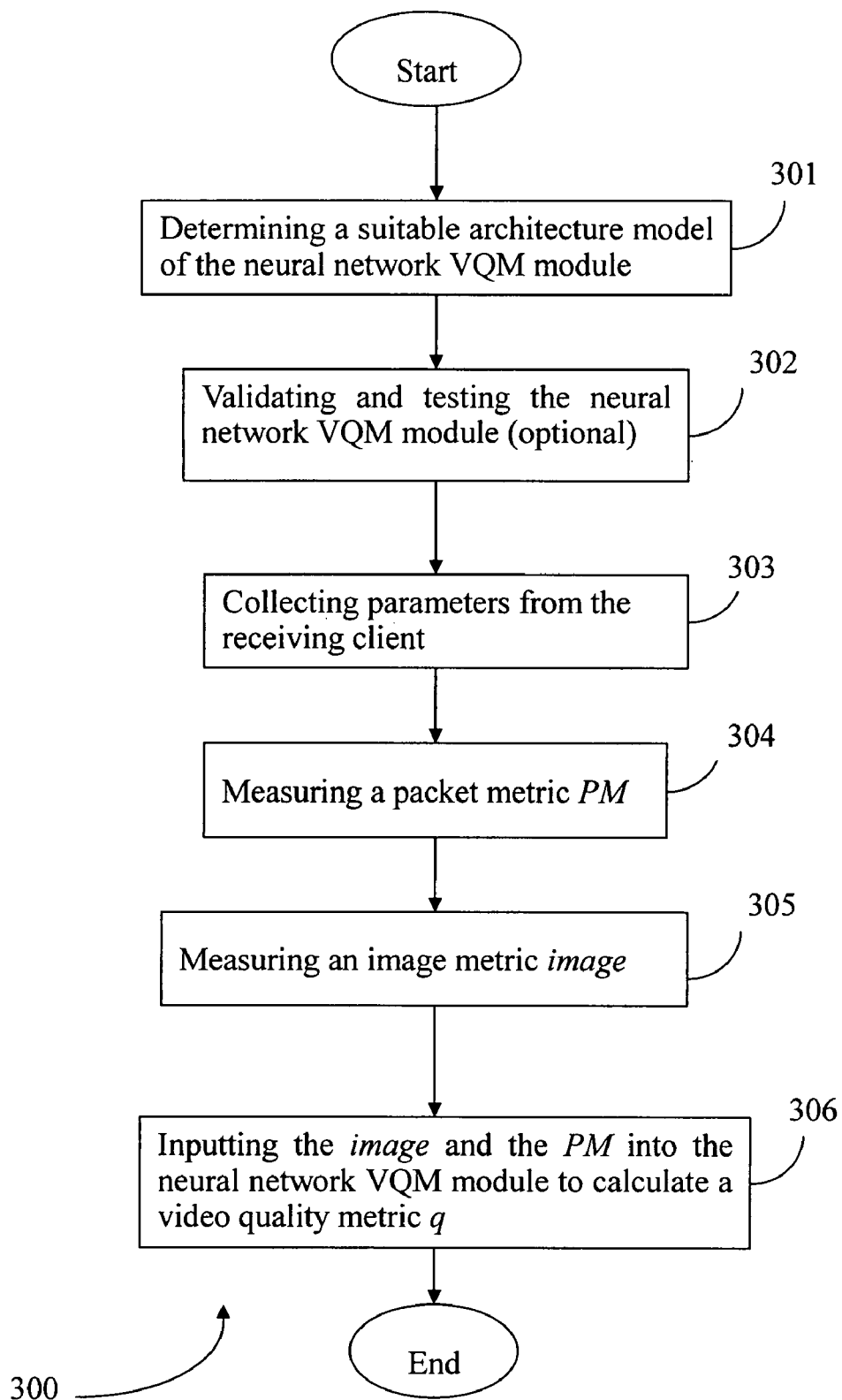
FIG. 3 is a flow chart diagram of a VQM method based on a hybrid of the image and packet metrics performed by the VQM system 100 shown in FIG. 1.

As described above, FIG. 1 shows the VQM system 100 according to one embodiment of the present invention. In addition, FIG. 3 shows a flow chart diagram of the operation of the VQM system 100 of FIG. 1. In FIG. 1, in addition to the VQM system 100, a receiving client 105 is shown to facilitate the description of the process of collecting parameters by the VQM system 100 from the receiving side. As can be seen from FIG. 1, the VQM system 100 includes an image metric measuring module 101, a packet metric measuring module 102, and a neural network VQM module 103.

The image metric measuring module 101 is employed to receive a video stream from the video decoder 1052 of the receiving client 105 and to calculate the image metric (e.g., an image differential metric) image of the video stream. Any method known in the art for measuring the image metric can be employed by the image metric measuring module 101 to calculate the image metric. An example of these methods will be described in more detail below with reference to FIGS. 9-10.

Referring again to FIG. 1, the packet metric measuring module 102 is responsible for obtaining information about packet statistics of the video stream received by the receiving client 105 in RTP (Real-time Protocol) layer to generate the packet metric. For MPEG4 video stream (i.e., video stream in MPEG4 format), for example, the packet metric is a packet metric vector PM=<IR, PLR_I, PLR_P>$^T$, wherein IR, PLR_I and PLR_P represent I-frame rate, packet loss rate of I-frame and packet loss rate of P-frame respectively. For other video formats, other packet statistic parameters can be used as the packet metric PM. An example of the operations of the packet metric measuring module 102 in measuring the packet metric PM=<IR, PLR_I, PLR_P>$^T$ will be described below with reference to FIGS. 7-8.

Referring again to FIG. 1, the output of the image metric measuring module 101 and that of the packet metric measuring module 102 (i.e., image PM) are then applied as inputs to the neural network VQM module 103 to calculate the video quality metric of the video stream received from the receiving client 105. The neural network VQM module 103 then calculates the video quality metric q based on the image metric and packet metric. The structure and operation of the neural network VQM module 103 will be described in more detail below, with reference to FIGS. 2-6.

Figure 2:
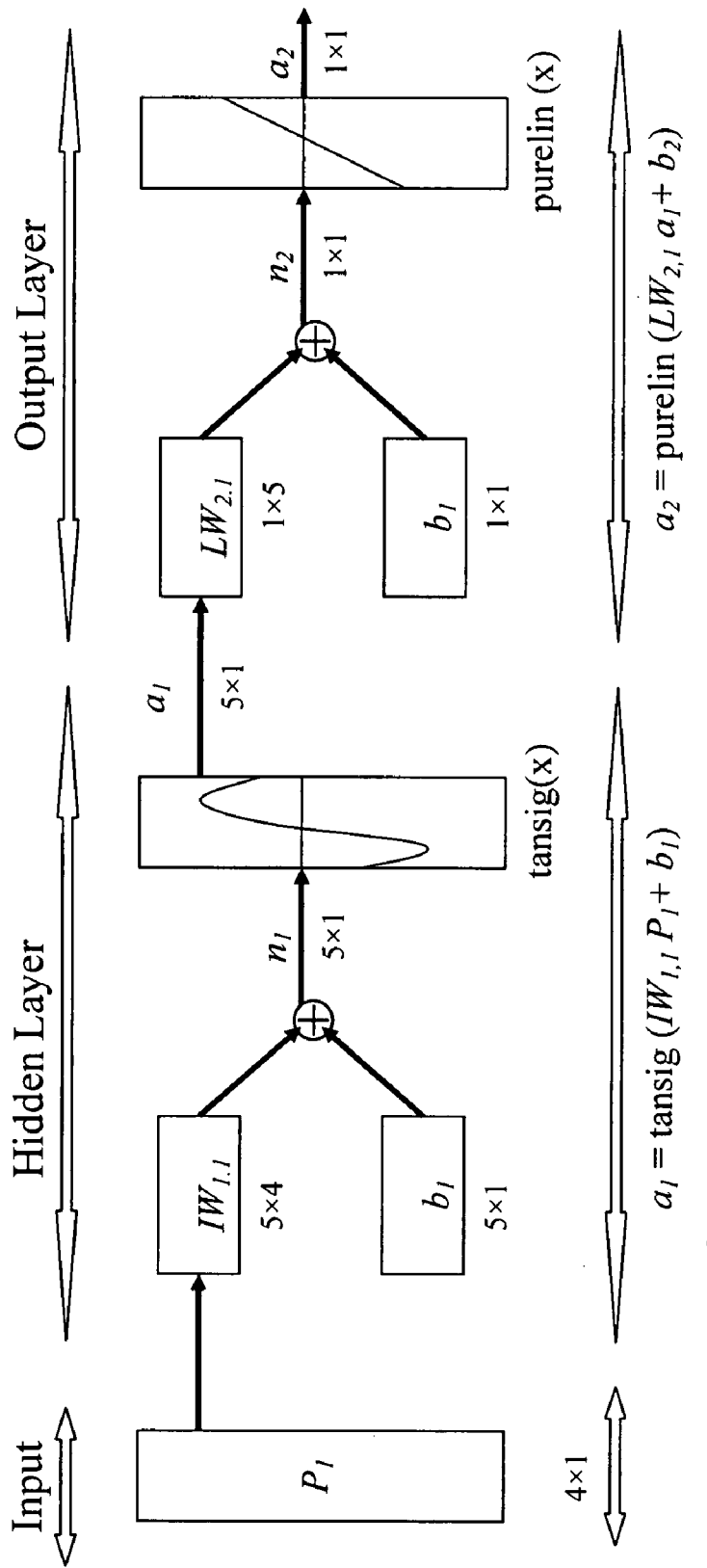
FIG. 2 is a structural diagram illustrating an example of the 10 architecture model of the neural network VQM module shown in FIG. 1.

FIG. 2 depicts an example of the architecture model of the neural network VQM module 103 of FIG. 1. As can be seen from FIG. 2, the model is a multiple-layer backward-propagation neural network model. In this neural network model, the input $P_I$ is a 4×1 vector, i.e. $P_I$=<IR, PLR_I, PLR_P, image>$^T$, representing I-frame rate, packet loss rate of I-frame, packet loss rate of P-frame and image differential metric, as described above. The output $a_2$ corresponds to the video quality metric q in FIG. 1. This neural network architecture model shown in FIG. 2 for implementing the VQM module 103 is for illustration purposes. In other embodiments, more complex neural network models may be employed in order to be applied to systems having more computational resources and requiring higher measurement precision.

In an embodiment, the architecture model of the neural network VQM module 103 is determined (or constructed) and validated by use of a VQM test-bed 110 (shown in FIG. 1) and the processes for determining and validating will be described below. Thus, the VQM test-bed 110 can be regarded as part of the VQM system 100, or as an additional component of the VQM system 100. In an alternative embodiment, the VQM system 100 may be implemented without the VQM test-bed 110.

FIG. 3 shows the overall operational process 300 of the VQM system 100 of FIG. 1 to generate the video quality metric based on a hybrid or combination of the image and packet metrics. In the flow chart of FIG. 3 (also with reference to FIG. 1), the process 300 begins with the construction and determination of a suitable neural network architecture model for the VQM module 103 (block 301). In one embodiment, the architecture model of the neural network VQM module 103 is determined and/or constructed by using a series of training samples generated by the VQM test-bed 110 to train a plurality of neural network candidates selected by the user of the VQM system 100, and the determining process will be described in more detail below. It should be noted, however, that the present invention is not limited to the above-described specific embodiment, but any known method for constructing a suitable neural network VQM module 103 may be applied.

After determining and constructing a suitable model for the neural network VQM module 103, the constructed neural network VQM module 103 can be validated and tested to evaluate its accuracy and adaptability (block 302). This operation is optional. In an embodiment, the validating and testing is also performed by the VQM test-bed 110 as will be described in more detail below. However, the method for validating and testing the neural network VQM module 103 is not limited to the specific embodiment.

Next, the image metric measuring module 101 and the packet metric measuring module 102 of the VQM system 100 collect parameters from the receiving client 105 (block 303), including the video stream from the video decoder 1052 and packet statistics information from the RTP layer 1053. Then, the image metric image and the packet metric PM are generated by the image metric measuring module 101 and the packet metric measuring module 102, respectively (blocks 304 and 305). The detailed processes for generating the image metric image and the packet metric PM will be described in more detail below. The generated image metric image and packet metric PM are then applied to the neural network VQM module 103 (block 306), where the video quality metric q is calculated.

Next, with reference to FIGS. 4 to 10, the structures of the VQM test-bed 110, the image metric measuring module 101 and the packet metric measuring module 102 as well as their functions and operations will be described in more detail. It should be noted, however, that the structures and operations of these modules are not limited to the specific embodiments described herein.

The VQM Test-Bed

As is described above and in conjunction with FIGS. 1-3, the neural network VQM module 103 needs to have its architectural model determined and/or constructed first. To accomplish this, the user of the VQM system 100 first selects a plurality of neural network candidates. Then, a typical training sequence S=<$s_0$, $s_1$, $s_2$, ..., $s_n$> is generated by the VQM test-bed 110 to train the neural network candidates to select an optimal neural network as the architectural model of the neural network VQM module 103. One Is training sample $s_i$=<$I_i$, $O_i$> (0≦i≦n) includes an input vector $I_i$=<$IR_i$, $PLR\_I_i$, $PLR\_P_i$, $image_i$>$^T$ and a corresponding output $O_i$. That is to tell the neural network that its architecture model should generate the output $O_i$ if the input of the module is $I_i$. In the embodiment, the input $I_i$ is a 4×1 vector, representing I-frame rate, packet loss rate of I-frame, packet loss rate of P-frame and image differential metric respectively. The output $O_i$ is the video quality metric for the evaluated video. Therefore, in order to select an optimal neural network model for the VQM module 103, a plurality of training samples $s_i=<I_i, O_i>$ ($0 \leq i \leq n$) need to be generated first. In the embodiment, the VQM test-bed 110 is used to emulate network conditions and generate a distorted video d, which is in turn used to construct the training samples $s_i=<I_i, O_i>$ ($0 \leq i \leq n$) (to be described in more detail below). Furthermore, in addition to generating the training samples, the VQM test-bed 110 may also be used to validate and test the selected architecture model of the neural network VQM module 103.

In one embodiment, the VQM test-bed 110 has two operation modes: a distorted video generation mode and a model validation mode.

Figure 4:
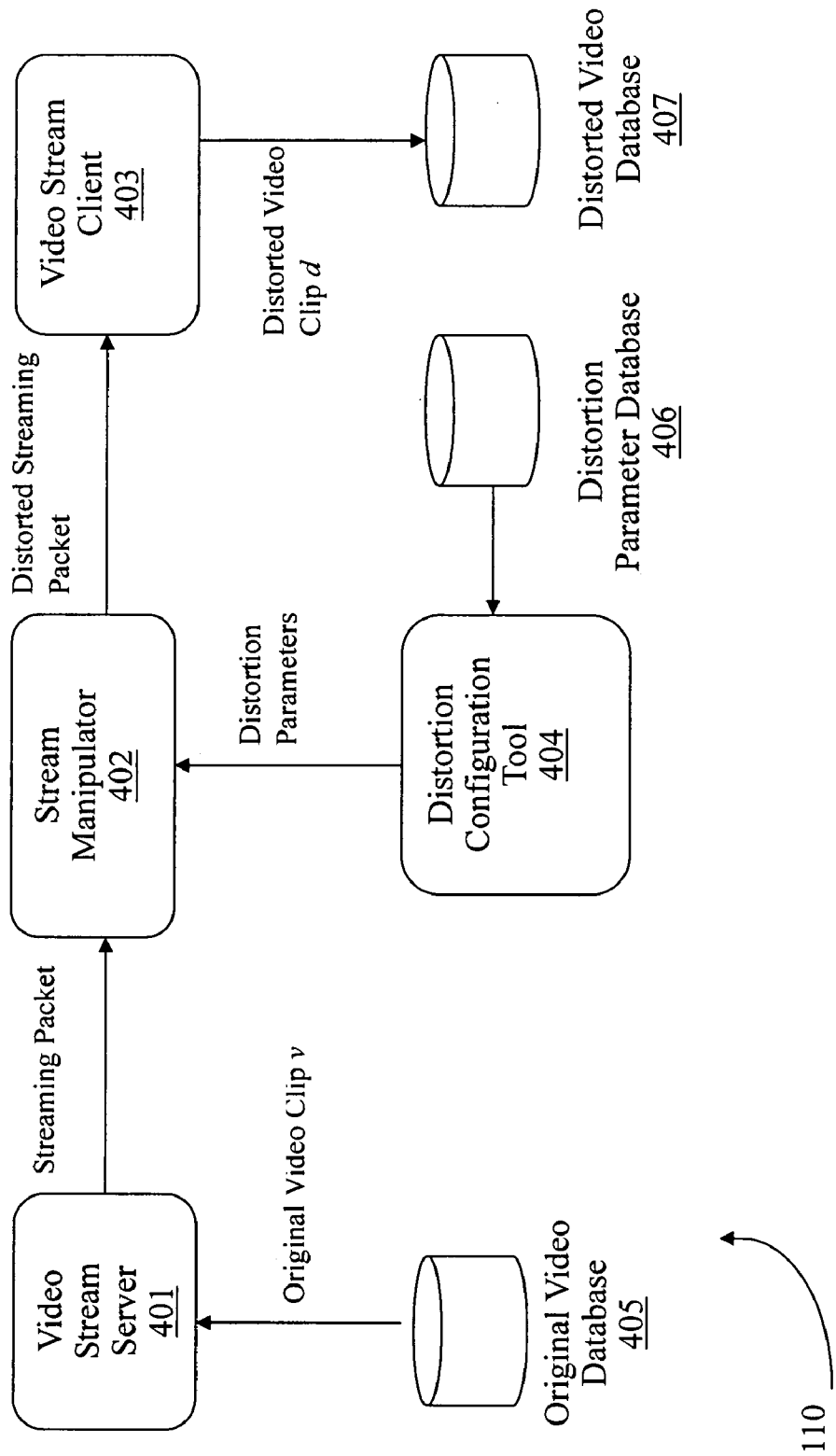
FIG. 4 illustrates a block diagram of the VQM test-bed shown in FIG. 1 that emulates various network conditions.

FIG. 4 shows the structure of the VQM test-bed 110 which will be described below with reference to the distorted video generation mode. As shown in FIG. 4, the VQM test-bed 110 includes a video stream server 401, a stream manipulator 402, a video stream client 403, a distortion configuration tool 404, an original video database 405, a distortion parameter database 406, and a distorted video database 407. With reference to FIG. 4, the process for generating a training sample $s_i=<I_i, O_i>$ will be described below.

First, the distortion parameter database 406 in the VQM test-bed 110 is constructed to store a portion of the input vector $I_i$, namely $<IR_i, PLR\_I_i, PLR\_P_i>^T$ ($0 \leq i \leq n$). These initial parameters are determined beforehand through a practical network measurement. The methods for determining these network parameters are well-known by those skilled in the art, and thus they will not be described in detailed below.

Subsequently, the distortion configuration tool 404 specifies a distortion configuration based on the distortion parameter database 406 and uses the distortion configuration to configure the stream manipulator 402. After configuring the stream manipulator 402, an original video clip v is selected from the original video database 405 and the streaming packets transmitting the clip are sent to the stream manipulator 402. The stream manipulator 402 emulates a network environment according to the distortion configuration specified by the distortion configuration tool 404, distorts the packets it receives and outputs the distorted streaming packets into the video stream client 403. The video stream client 403 stores the distorted video clip d in the distorted video database 407. Then, in an embodiment, an offline FR (full-reference) VQM method may be used to evaluate the distorted video quality, namely the output $O_i$, by referring to the original video clip v and the distorted video clip d. This RRVQM evaluation process to generate the video quality metric output $O_i$ for use in the VQM test-bed 110 is shown in FIG. 5, which will be described in more detail below.

Figure 5:
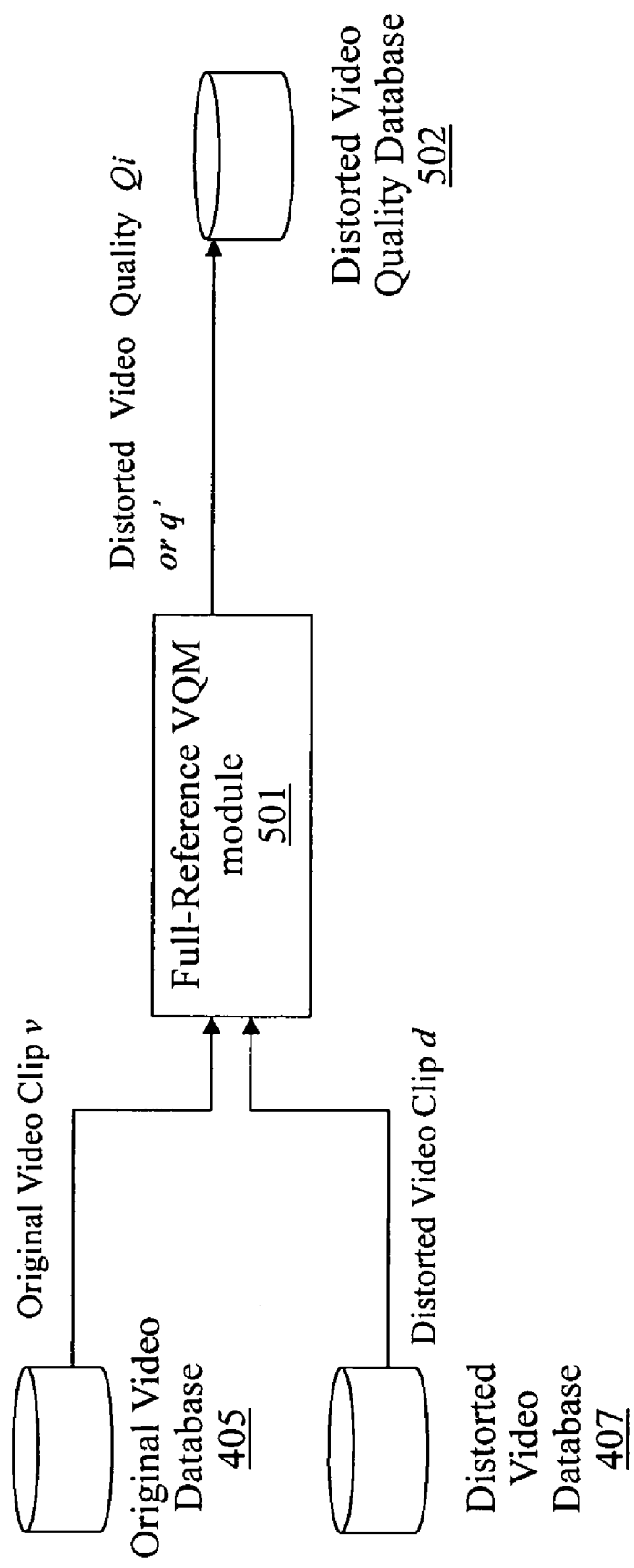
FIG. 5 shows how a distorted video quality database is generated for use in the VQM test-bed of FIG. 4.
Figure 6:
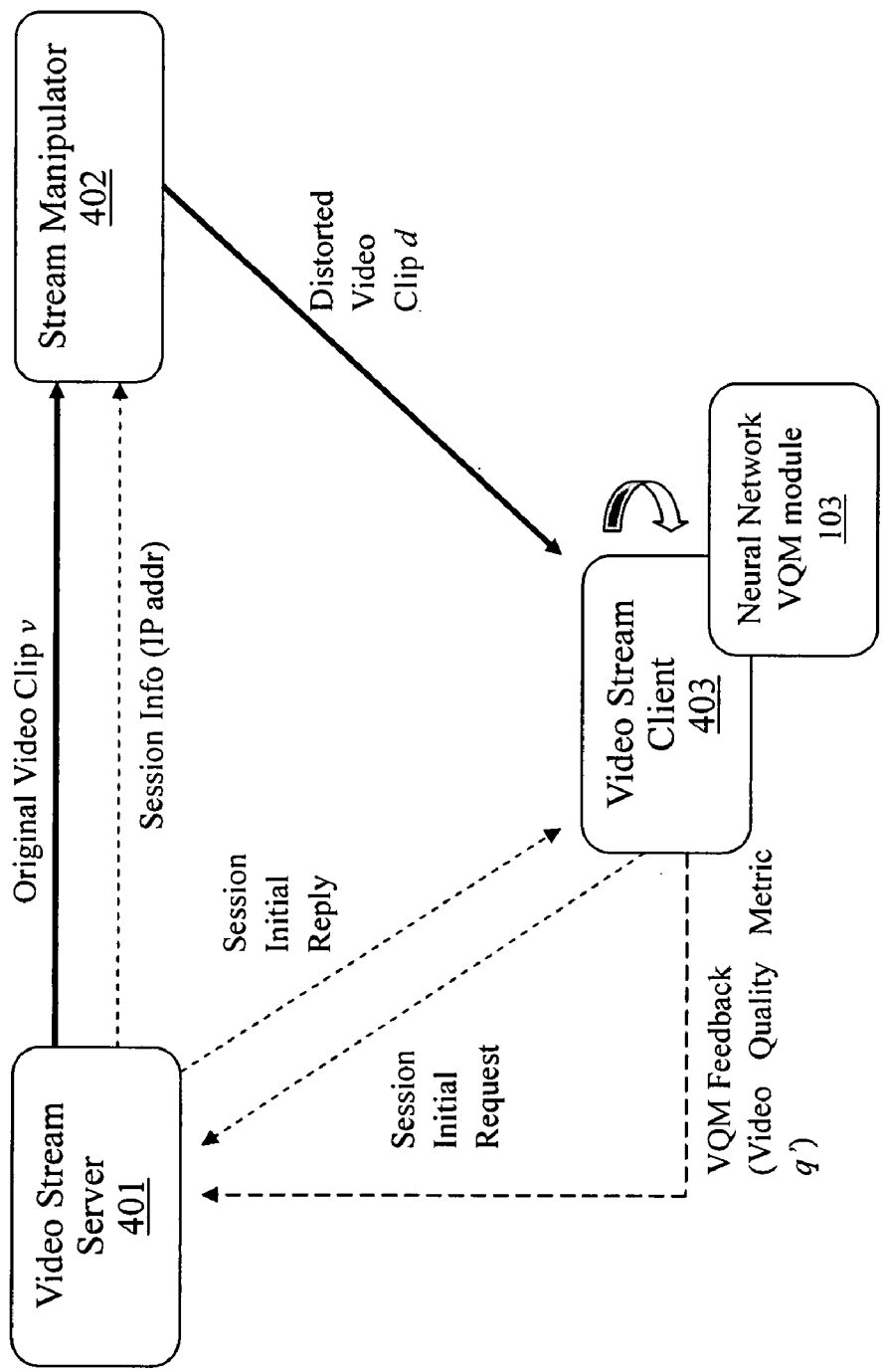
FIG. 6 depicts an example of the process for determining and validating the architecture model of the neural network VQM module of FIG. 1 by the VQM test-bed of FIG. 4.

In FIG. 5, a FRVQM module 501 is employed to generate the output $O_i$ from the original video clip v and the distorted video clip d. Thus, the FRVQM module 501 is also part of the VQM test-bed 110 of FIGS. 1 and 4. The obtained video quality metric $O_i$ can be stored in the distorted video quality database 502. Any FRVQM methods known by those skilled in the art can be used for the FRVQM module 501, such as peak signal to noise ratio (PSNR), ITS model, structural distortion based method etc. It should be noted that any kind of VQM method can be utilized to evaluate the distorted video quality, no matter objective or subjective. However, objective methods can save both cost and time. Moreover, FRVQM methods can provide accurate and precise video quality assessment as well. Because this processing is offline, more advanced and complex NRVQM methods can be used even though their computational complexity is very high.

Referring back to FIGS. 1 and 4, the distorted video clip d is also sent to the image metric measuring module 101 of FIG. 1 to calculate an image differential metric $image_i$, as the other part of the input vector $I_i$. The image metric measuring module 101 can utilize one of the existing NRVQM methods to generate the image differential metric $image_i$. An example of the NRVQM methods will be described below with reference to FIGS. 9-10. It should be noted that other NRVQM methods for generating an image metric can be used here. Then, the original parameters vector $<IR_i, PLR\_I_i, PLR\_P_i>^T$ is combined with the image differential metric $image_i$ to construct a complete input vector $I_i$. Therefore, one complete training sample $s_i=<I_i, O_i>$ is obtained.

All of the training samples $s_i=<I_i, O_i>$ ($0 \leq i \leq n$) generated in this way are then used to train the neural network candidates to obtain an optimal architectural model of the neural network VQM module 103. The methods for training a neural network by a typical training sequence are well-known by those skilled in the art, and thus are omitted here.

As described above in block 302 of FIG. 3, after constructing the architectural model for the neural network VQM module 103, the VQM test-bed 110 can be used to validate and test its accuracy and adaptability. At that time, the VQM test-bed 110 is in the model validation mode. The the VQM test-bed 110 will be described below with reference to the model validation mode, also in conjunction with FIGS. 1, and 4-6.

As shown in FIGS. 1 and 4-6, in the model validation mode, the validating process performed by the VQM test-bed 110 includes three stages: session setup, streaming packet transmission, and video quality measurement and feedback. At the first stage, the video stream client 403 sends a session initial request to the video stream server 401. The server 401 then obtains the client information from the request, initializes a session, and delivers a session initial reply to the client 403. At the same time, the server 401 also initializes the stream manipulator 402.

At the second stage, the server 401 reads one of the original video clips v, packetizes and delivers the streaming packets in the clip v to the stream manipulator 402. The stream manipulator 402 can emulate various network conditions through the user specifying different IP impairments, such as packet loss rate, jitter and delay. The stream manipulator 402 then distorts the received streaming packets and sends the distorted streaming packets to the client 403.

At the third stage, the client 403 records the distorted video clip d and calculates a distorted video quality metric q based on the generated neural network VQM module 103. The distorted video quality metric q is fed back to the video stream server 401.

After finishing this process, the FRVQM module 501 of FIG. 5 is used to calculate the video quality q' for the distorted video clip d. And then, the video quality metrics q and q' are used to a correlation analysis process to evaluate the accuracy and adaptability of the constructed architectural model of the neural network VQM module 103.

The Packet Metric Measuring Module

Figure 7:
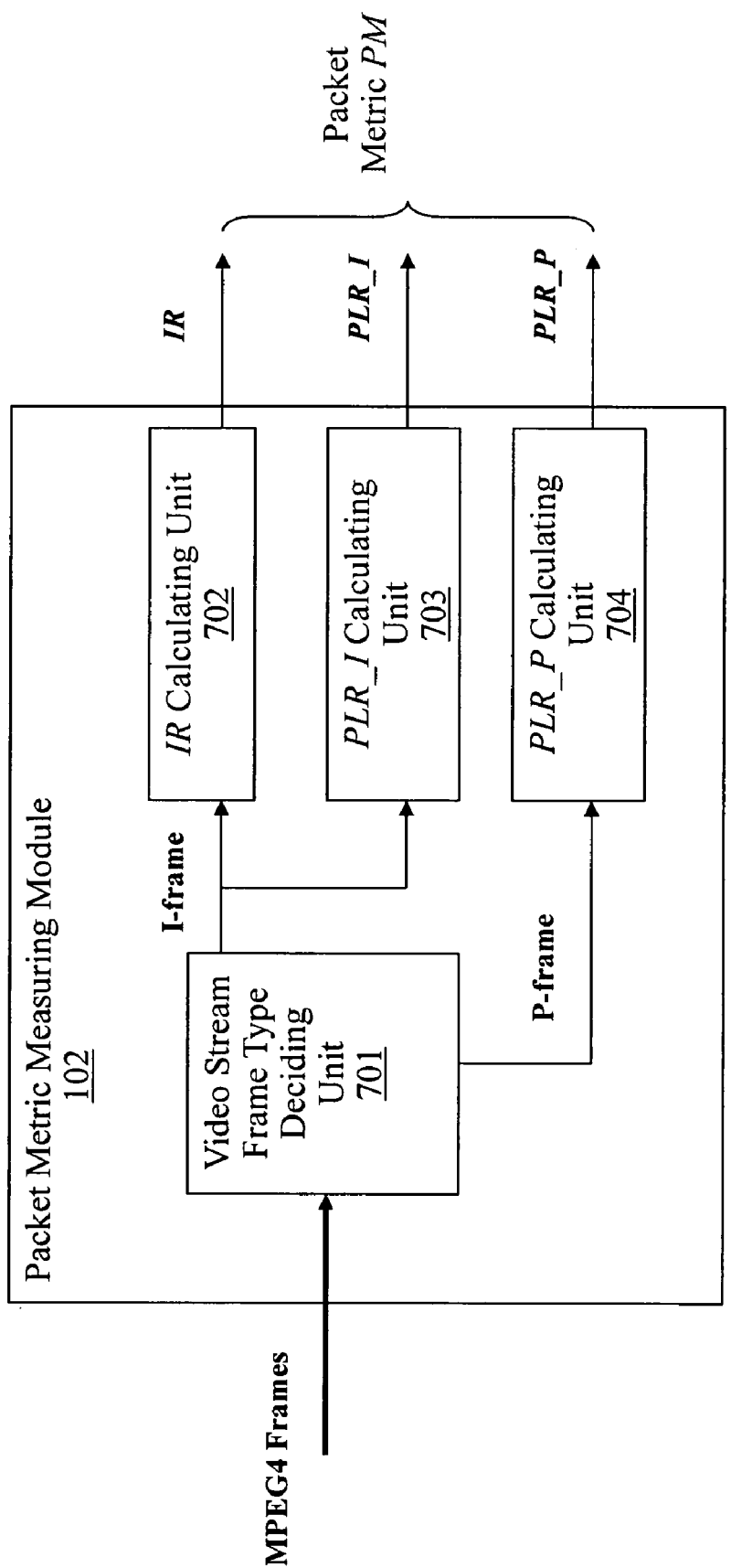
FIG. 7 illustrates a block diagram of an example of the packet metric measuring module of FIG. 1.

FIG. 7 illustrates a block diagram of an example of the packet metric measuring module 102 of the VQM system 100 shown in FIG. 1. The packet metric measuring module 102 includes a video stream frame type deciding unit 701, an IR calculating unit 702, a PLR_I calculating unit 703 and a PLR_P calculating unit 704. The packet metric measuring module 102 receives, for example, a plurality of MPEG4 frames from the video stream of FIG. 1, each of which comprises several RTP packets. The packet metric measuring module 102 then obtains information about packet statistics in RTP layer and outputs the packet metric PM. In the example, the packet metric PM is a vector PM=<IR, PLR_I, PLR_P>$^T$, wherein IR, PLR_I and PLR_P represent I-frame rate, packet loss rate of I-frame and packet loss rate of P-frame for a MPEG4 video stream respectively. It should be noted, however, the present invention is not limited to the specific example, and other packet statistics can be used to construct the packet metric PM.

Figure 8:
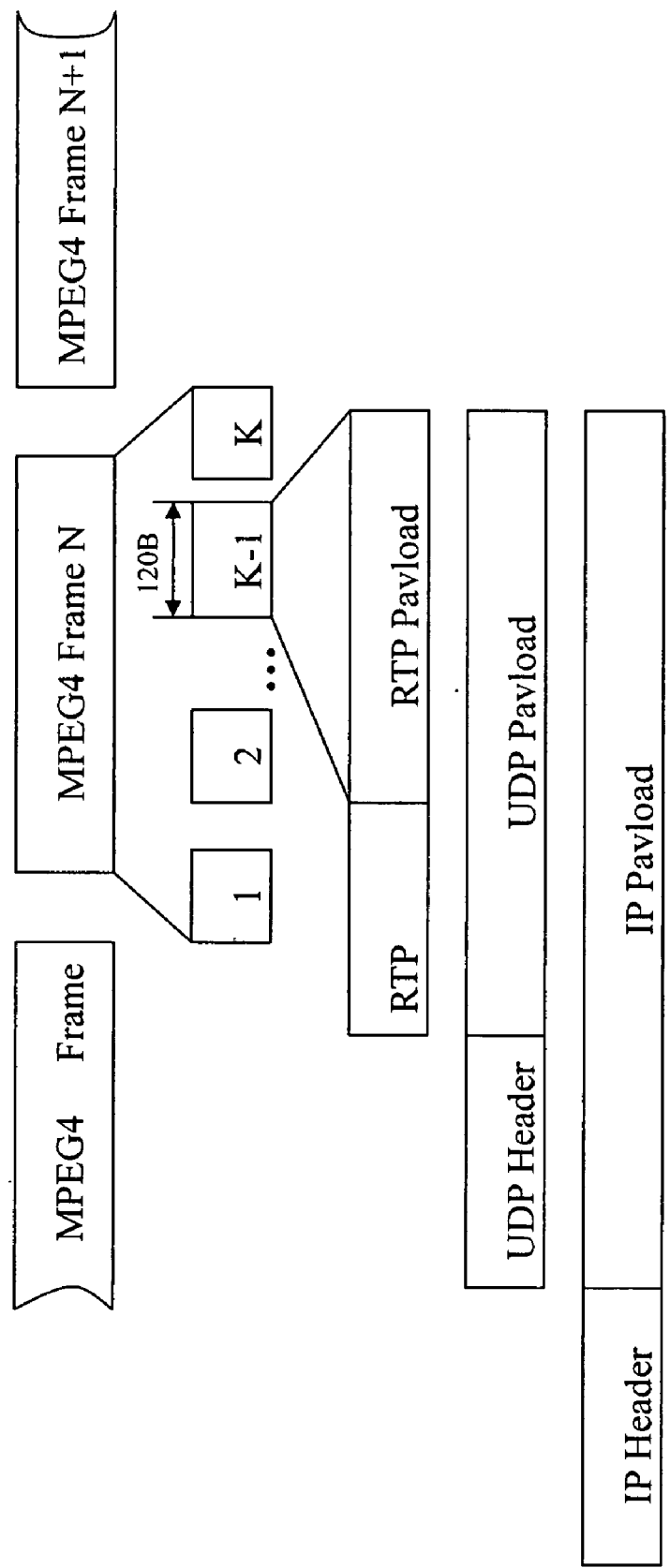
FIG. 8 is a diagram depicting a transmission protocol stack of MPEG4 image frames of the video stream of FIG. 1.

In FIG. 8, a diagram for depicting a transmission protocol stack of MPEG4 image frames of the video stream of FIG. 1 is shown. With the packet metric measuring module 102, a plurality of MPEG4 frames are received first. Supposed that the RTP packet statistics per second are considered, and as well-known by those skilled in the art, the number of MPEG4 frames per second is 25 or 30, for example, 30 MPEG4 frames are received by the packet metric measuring module 102 first. The 30 frames are sent to the video stream frame type deciding unit 701 one by one to determine their types. As well-known by those skilled in the art, the MPEG4 frames are classified into I-frame, P-frame, B-frame and D-frame. In each frame header of MPEG4, there are some fields to represent the frame type in MPEG4 standard. Therefore, when a specific frame $f_i$ is received, the type of the frame (I-frame, P-frame, etc.) can be determined by the video stream frame type deciding unit 701 according to these fields.

After determining the type of the frame $f_i$, the process proceeds to determine various RTP packet statistics. In particular, if the frame $f_i$ is determined as an I-frame, a counter (not shown) in the IR calculating unit 702 for counting the I-frame number will be increased 1. And then the I-frame rate for one second IR can be obtained. At the same time, the frame $f_i$ is sent to the PLR_I calculating unit 703 to calculate the packet loss rate for that frame. In each RTP fixed header, there is a field called sequence number to be used to detect packet loss and to store packet sequence. And a Marker bit (M) is used for indicating the last packet for transmitting a frame data. For the frame $f_i$, we can get its first and last sequence number, denoted by $s^i_{min}$ and $s^i_{max}$ respectively. When a new packet for the frame is received, a packet counter (not shown) in the PLR_I calculating unit 703 is increased 1, that is, $c_i=c_i+1$ for frame $f_i$. When the last packet of the frame $f_i$, which Marker bit (M) is set 1, is received, we can calculate the total number of packets to be used for transmitting this frame $f_i$ over the network, $n_i=s^i_{max}-s^i_{min}+1$, the number of loss packet $l_i=n_i-c_i$, and the packet loss rate $r_i=l_i/n_i$. For all I-frames in one second, a total packet loss rate is calculated by the PLR_I calculating unit 703 as the packet loss rate for I-frame PLR_I. On the other hand, if the frame $f_i$ is determined as a P-frame, the frame $f_i$ is sent to the PLR_P calculating unit 704 to calculate the packet loss rate for that frame. The process for calculating the packet loss rate for a P-frame is the same as that for an I-frame. And then a total packet loss rate for all P-frames in one second is calculated by the PLR_P calculating unit 704 as the packet loss rate for P-frame PLR_P. Then the packet metric vector PM=<IR, PLR_I, PLR_P>$^T$ can be obtained. As described above, the process for obtaining the packet metric is not limited to the specific embodiment, and other appropriate methods can be utilized.

The Image Metric Measuring Module

Figure 9:
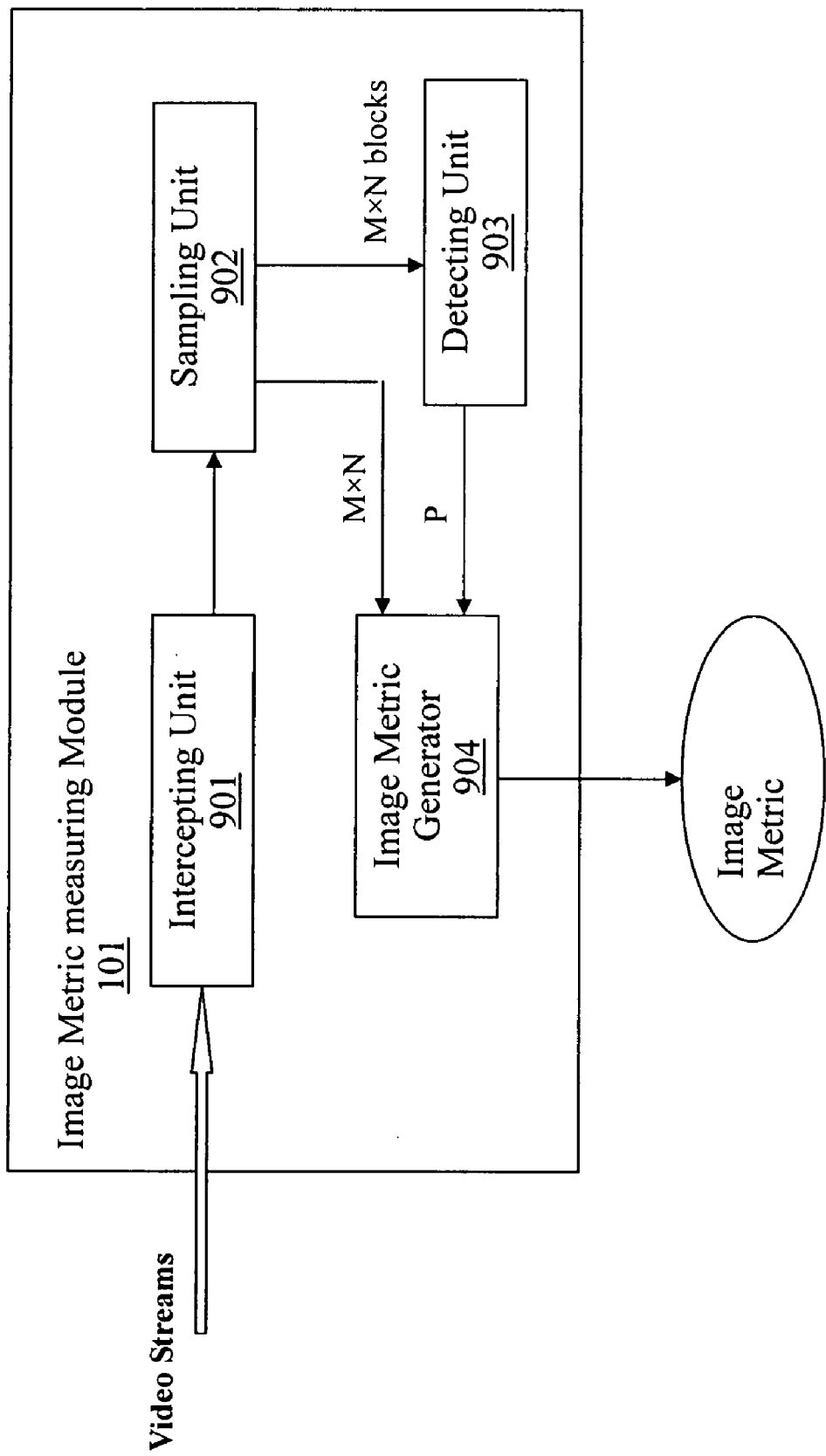
FIG. 9 illustrates a block diagram of an example of the image metric measuring module of FIG. 1.
Figure 10:
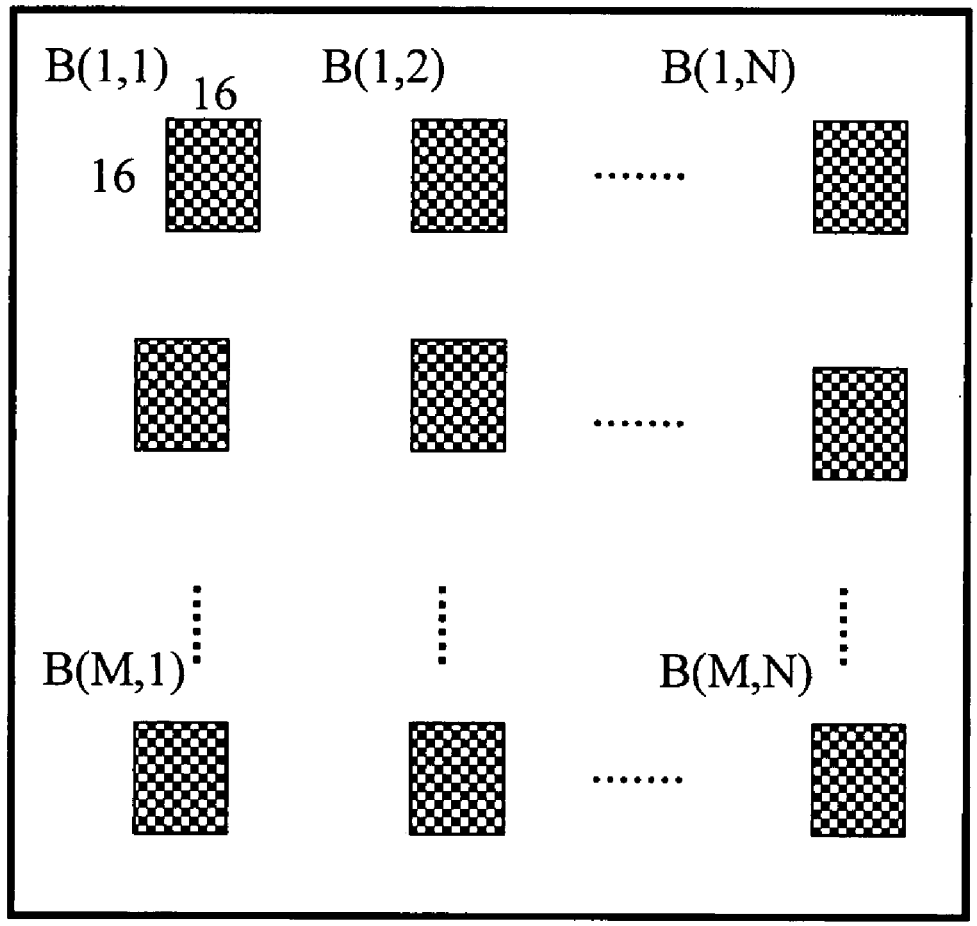
FIG. 10 is a schematic diagram of an example of the sampling process of the sampling unit of FIG. 9.

In an embodiment, an example of the image metric measuring module 101 for calculating the image metric image is shown in FIG. 9. The image metric measuring module 101 includes a intercepting unit 901 for intercepting a plurality of adjacent image frames, a sampling unit 902 for sampling a plurality of pixel blocks in each image frame, a detecting unit 903 for detecting the change of each sampled block over the intercepted frames to determine the number of blocks having experienced image quality decline, and an image metric generator 904 for generating the image metric image. Instead of processing the entire image area of an image frame to obtain or calculate the image metric, the sampling unit 902 in the image metric measuring module 101 only samples some blocks of the image frame. For example, M×N blocks forming a matrix in an image frame may be sampled, as shown in FIG. 10. Therefore, the image metric measuring module and method provides a compromise between accuracy and speed. In the embodiment, the image metric image is measured as image=P/M×N, wherein P is the number of blocks having experienced image quality decline. It should be noted, however, the present invention is not limited to the specific embodiment, any other systems and methods for measuring the image metric for a video stream can be used here.

As described above, after the packet metric measuring module 102 measures the packet metric PM and the image metric measuring module 101 measures the image metric image, the packet metric PM and the image metric image are sent as an input vector $P_I$ to the neural network VQM module 103 to obtain the video quality metric q.

The VQM system and method according to one embodiment of the present invention combine the packet metric and the image metric together to evaluate in-service video quality in real-time so that it can overcome the shortcoming of the VQM methods which just use either the image metric or the packet metric. The VQM system and method in accordance with embodiments of the present invention enable NR real-time in-service video quality measurement to correlate with human perception. Meanwhile, the VQM system and method in accordance with embodiments of the present invention have minimized computational complexity so that they can be applied to wireless VQM applications or portable instruments. Moreover, they also can be applied to network troubleshooting.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A video quality measurement (VQM) system for a video stream, comprising:
    an image metric measuring module to measure an image metric of the video stream;
    a packet metric measuring module to measure a packet metric of the video stream;
    a neural network VQM module coupled to the image metric measuring module and the packet metric measuring module to calculate a video quality metric of the video stream based on the image metric and the packet metric; and
    a VQM test-bed coupled to the neural network VQM module to determine and validate the architecture of the neural network VQM module;
    wherein the video stream is a MPEG4 video stream and the packet metric is related to packet loss rate of I-frame, packet loss rate of P-frame, and I-frame rate; and
    wherein the packet metric measuring module further comprises:

a frame type deciding unit for determining the type of the received MPEG4 image frame;

a packet loss rate of I-frame calculating unit for calculating the packet loss rate of I-frame;

a packet loss rate of P-frame calculating unit for calculating the packet loss rate of P-frame; and a I-frame rate calculating unit for calculating the I-frame rate.

2. The system according to claim 1, wherein the image metric measuring module uses a no-reference VQM method to generate the image metric.

3. A video quality measurement (VQM) system for a video stream, comprising:

an image metric measuring module to measure an image metric of the video stream;

a packet metric measuring module to measure a packet metric of the video stream;

a neural network VQM module coupled to the image metric measuring module and the packet metric measuring module to calculate a video quality metric of the video stream based on the image metric and the packet metric; and a VQM test-bed coupled to the neural network VQM module to determine and validate the architecture of the neural network VQM module;

wherein the image metric measuring module further comprises:

a intercepting unit for intercepting a plurality of adjacent image frames from the video stream;

a sampling unit for sampling a plurality of pixel blocks in each of the intercepted image frames;

a detecting unit for detecting the change of each sampled block over the intercepted frames to determine the number of blocks having experienced image quality decline; and an image metric generator for generating the image metric based on the detecting result of the detecting unit.

4. The system according to claim 3, wherein the video stream is a MPEG4 video stream and the packet metric is related to packet loss rate of I-frame, packet loss rate of P-frame, and I-frame rate.

5. The system according to claim 4, wherein the packet metric measuring module further comprises:

a frame type deciding unit for determining the type of the received MPEG4 image frame;

a packet loss rate of I-frame calculating unit for calculating the packet loss rate of I-frame;

a packet loss rate of P-frame calculating unit for calculating the packet loss rate of P-frame; and a I-frame rate calculating unit for calculating the I-frame rate.

6. A video quality measurement (VQM) system for a video stream, comprising:

an image metric measuring module to measure an image metric of the video stream;

a packet metric measuring module to measure a packet metric of the video stream;

a neural network VQM module coupled to the image metric measuring module and the packet metric measuring module to calculate a video quality metric of the video stream based on the image metric and the packet metric; and a VQM test-bed coupled to the neural network VQM module to determine and validate the architecture of the neural network VQM module;

wherein the VQM test-bed comprises:

a video stream server for sending original video stream;

a stream manipulator for emulating a network environment according to distortion parameters from a distortion parameter database and distorting the original video stream;

a video stream client for receiving the distorted video stream; and the distortion parameter database for storing distortion parameters obtained by a previous network measurement.

7. The system according to claim 6, wherein the VQM test-bed further comprises a VQM module for comparing the original video stream and the distorted video stream to generate a reference video quality metric.

8. The system according to claim 7, wherein a series of training samples formed by the distortion parameters in the distortion parameter database and the reference video quality metric are used to train a plurality of neural network candidates to determine the architecture model of the neural network VQM module.

9. The system according to claim 7, wherein the VQM module uses a subjective VQM method to generate the reference video quality metric.

10. The system according to claim 7, wherein the VQM module uses a full-reference (FR) objective VQM method to generate the reference video quality metric offline.

11. The system according to claims 7, wherein the reference video quality metric is compared with the output of the neural network VQM module to perform a correlation analysis.

12. A video quality measurement (VQM) method for a video stream, comprising:

constructing a neural network VQM module;

calculating an image metric for the video stream;

calculating a packet metric for the video stream; and calculating, by use of the neural network VQM module, a video quality metric based on the image metric and the packet metric;

wherein the calculating the image metric further comprises:

intercepting a plurality of adjacent image frames from the video stream;

sampling a plurality of pixel blocks in each of the intercepted image frames;

detecting the change of each sampled block over the intercepted frames to determine the number of blocks having experienced image quality decline; and generating the image metric based on the result of the detecting.

13. The method according to claim 12, further comprises validating the neural network VQM module after it is constructed.

14. The method according to claim 13, wherein the validating is also performed by the VQM test-bed.

15. The method according to claim 14, wherein the validating further comprises comparing the reference video quality metric with the output of the neural network VQM module to perform a correlation analysis.

16. The method according to claim 12, wherein the constructing is performed by a VQM test-bed.

17. The method according to claim 16, wherein the constructing by the VQM test-bed further comprises:

selecting a plurality of neural network candidates;

generating a series of training samples using the VQM test-bed; and training the neural network candidates with the training samples to select the neural network VQM module.

18. The method according to claim 12, wherein the packet metric is based on packet-level characteristics of the video stream.

19. The method according to claim 18, wherein the video stream is a MPEG4 video stream and the packet metric is related to packet loss rate of I-frame, packet loss rate of P-frame and I-frame rate.

20. The method according to claim 19, wherein the calculating the packet metric further comprises:
    determining the type of each of the MPEG4 frames; and
    calculating the packet loss rate of I-frame, the packet loss rate of P-frame and the I-frame rate as the packet metric.

* * * * *